United States Patent Office 3,702,364
Patented Nov. 7, 1972

3,702,364
STABILIZED CHLORAMPHENICOL COMPOSITION
Malcolm P. Boghosian, Long Beach, and John W. Wilson, Jr., Los Altos, Calif., assignors to Allergan Pharmaceuticals, Santa Ana, Calif.
No Drawing. Continuation-in-part of abandoned application Ser. No. 605,713, Dec. 29, 1966. This application Feb. 9, 1970, Ser. No. 9,986
Int. Cl. A61k 21/00
U.S. Cl. 424—324
2 Claims

ABSTRACT OF THE DISCLOSURE

A physically and chemically stable chloramphenicol solution comprising relatively small amounts of chloramphenicol stabilized by a polyoxyethylene derivative of a fatty acid in combination with a long-chain polyol.

CROSS-REFERENCE TO RELATED APPLICATIONS

This is a continuation-in-part of U.S. Ser. No. 605,713, filed Dec. 29, 1966, and now abandoned, entitled "Stabilized Chloramphenicol Composition."

BACKGROUND OF THE INVENTION

The present invention relates to a method for producing highly stable chloramphenicol compositions. More specifically, this invention relates to a method for producing chemically and physically stable solutions of chloramphenicol.

Chloramphenicol [D(-)threo - 2,2 - dichloro - N - ($\beta$-hydroxy - $\alpha$ - (hydroxymethyl)-p-nitrophenethyl) acetamide] is a broad spectrum antibiotic having the formula

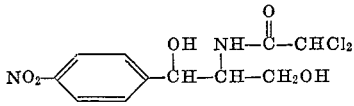

Clinical experience has shown chloramphenicol to have therapeutic activity against a wide variety of organisms including rickettsiae, certain viruses and many bacteria. For these reasons, chloramphenicol is currently in wide use. However, the use of chloramphenicol in liquid form is presently limited by its relatively unstable nature in solution or in suspension.

The effectiveness of chloramphenicol compositions is presently described in terms of the stability or resistance to change of the chloramphenicol over a period of time. The term "stability," as used herein, refers to both the chemical and physical properties of chloramphenicol compositions. Physical change refers to the change in the physical properties, e.g., phase separation and crystal growth. Chemical change refers to the degradation of chloramphenicol into other products. Chloramphenicol may degrade into products which are harmless to humans or it may degrade by other degradation paths, into products which are harmful to humans in certain applications, e.g., ophthalmic usage.

Presently available chloramphenicol solutions or suspensions are short-dated, that is, their use is limited to relatively short periods by the manufacturer, because they exhibit physical and/or chemical instability, including degradation into products harmful to humans. Various methods and means have been employed to extend the stable life of chloramphenicol compositions. One such method includes separate packaging of the individual components necessary to produce the chloramphenicol composition. For example, one package may contain a buffered, lyophilized chloramphenicol-containing cake and a second package may contain a sterilized dropper. Sterile water is added to the lyophilized cake to produce a chloramphenicol solution at the time of purchase by the ultimate consumer. By postponing formulation of chloramphenicol compositions until purchase by the ultimate consumer, the active life of the chloramphenicol is, in effect, extended. However, because an addition is made to the chloramphenicol cake at the time of purchase, there is a danger that bacteria which are detrimental to human health will be introduced into the chloramphenicol solution. Thus, because druggists' procedures, although good, are nevertheless inferior to the sterile packaging procedures of manufacturing companies, the chloramphenicol compositions sold by this method are less safe for human use than are the chloramphenicol solutions completely prepared by the manufacturer. Additionally, the stable life of such chloramphenicol compositions once compounded, are still relatively short. Furthermore, the added step is an inconvenience to the individual and presents an opportunity for error.

Another approach directed to improving the physical stability of chloramphenicol compositions comprises forming suspensions of chloramphenicol and polyethylene glycol in, for example, water. Such suspensions provide good physical stability for up to about two months. However, because suspensions are formed (as opposed to solutions), some separation of the phases and some crystal growth do take place after this time.

SUMMARY OF THE INVENTION

In general, chemically and physically stable compositions of chloramphenicol comprising this invention are produced by formulating solutions containing chloramphenicol in combination with members of a polyoxyethylene derivative of a fatty acid and a long-chain polyol. Preferably, the chloramphenicol compositions of this invention are aqueous solutions containing: (1) relatively small amounts of chloramphenicol and a water-soluble polyoxyethylene derivative of a fatty acid and, (2) specific amounts of a long-chain water-soluble polyol. The chloramphenicol solutions of this invention may also include minor amounts of other components such as, for example, germicidal compounds.

Chloramphenicol solutions of this invention provide both physical and chemical stability at normal room temperatures for long periods, for example, from 1 to 2 years and longer. Not only is the rate of degradation of chloramphenicol greatly retarded by the components added to the chloramphenicol solutions as described above, but such components apparently prevent chloramphenicol degradation to undesirable end products. That is, chloramphenicol degradation products having an adverse effect on humans, for example, eye irritants, are not found in tne chloramphenicol solutions of this invention even after periods of 1 to 2 years. Additionally, the compounds added to the chloramphenicol solutions of this invention increase the solubility of chloramphenicol in water.

DESCRIPTION OF PREFERRED EMBODIMENTS

The polyoxyethylene derivatives of fatty acids employed for the purposes of this invention will first be described. Although the term "fatty acid' is often used to designate naturally-produced fatty acids having an even number of carbons, the term "fatty acid," as used herein, will designate carboxylic acids naturally or synthetically derived from hydrocarbons by the equivalent of oxidation of a methyl group and having an odd or an even number of carbon atoms. Preferably, the carboxylic acids have from about 12 carbons to about 22 carbons. The fatty acids may be either saturated or unsaturated. Examples of the fatty acids from which the herein-used polyoxyethylene derivatives are derived as lauric, palmitic, stearic, oleic and myristic acids. The polyoxyethylene derivatives of the above-described fatty acids include: polyoxyethylene esters of fatty acids having the general formula $$H(OCH_2CH_2)_nO \cdot CO-R$$

wherein $n$ is a positive integer and R is the hydrocarbon residue of a fatty acid such as for example lauric, palmitic, stearic and oleic acids; and polyoxyethylene ether-esters having the general formula $(H(OCH_2CH_2)_nO)_n \cdot R'OCOR$ where $n$ and $n'$ are positive integers, R is the hydrocarbon residue of a fatty acid and R' is an alkyl, cycloalkyl or aryl group.

The preferred polyoxyethylene fatty acid ester is polyoxyethylene 40 stearate sometimes referred to as polyoxyl 40 stearate. Polyoxyethylene 40 stearate is the monostearate ester of a condensation polymer represented by the following formula: $C_{17}H_{35}COO(CH_2CH_2O)_nH$ in which $n$ is approximately 40. The average molecular weight of this ester is approximately 2044. It is available from Atlas Powder Company under the trademark Myrj 52.

The term "polyoxyethylene derivative of a fatty acid" also encompasses polyoxyethylene ether derivatives of the alcohol equivalents of the above-described fatty acids. Such polyoxyethylene ethers have the general formula $$H(OCH_2CH_2)_nO-R$$

wherein $n$ is a positive integer and R is the hydrocarbon residue of an alcohol such as, for example, lauryl alcohol, oleyl alcohol and cholesterol.

These polyoxyethylene derivatives of fatty acids are exemplified by: polyoxyethylene alkyl ethers, polyoxyethylene monostearates, polyoxyethylene sorbitan monooleates, polyoxyethylene lanolin ether, polyoxyethylene sorbitan monostearate, and polyoxyethylene sorbitan tristearate.

The polyoxyethylene derivatives of fatty acids also include the complex mixture of substances produced by the reaction of lanolin and ethylene oxide.

As used hereafter, the term "polyoxyethylene derivative" will be used to designate the polyoxyethylene derivatives of fatty acids as described.

The polyoxyethylene derivatives of the compositions of this invention may include a single species of the polyoxyethylene derivatives of a fatty acid or they may include a combination of species, for example, palmitic and stearic polyoxyethylene esters or polyoxyethylene lauryl ether and polyoxyethylene stearate. Furthermore, the polyoxyethylene component may be ionic or non-ionic. Due to the greater stability of the nonionic polyoxyethylene components of this invention to acids and bases, the use of non-ionic polyoxyethylene derivatives of fatty acids is preferred.

The particular member of the polyoxyethylene group employed in a particular chloramphenicol solution must be soluble in the solvent used in that solution. Because water is the preferred solvent, water-soluble members of the polyoxyethylene group will generally be employed.

The concentration of the polyoxyethylene derivatives of a fatty acid will vary depending upon the length of time between preparation of the chloramphenicol solution and its use by the ultimate consumer, that is, larger amounts of the polyoxyethylene derivative will be required as the time between preparation and ultimate consumer increases. However, the polyoxyethylene derivative concentration, as a minimum concentration, is maintained above about 1% by weight of the total chloramphenicol solution. Below about 1%, improvement in chemical stability over a chloramphenicol-in-solvent solution is, practically speaking of little utility. Hereafter, concentrations, as a percent, will be in terms of weight percent of the total chloramphenicol solution.

Preferably, the concentration of the polyoxyethylene derivative is maintained above about 5%. At concentrations above about 5%, polyoxyethylene derivatives are generally capable of maintaining the activity of the chloramphenicol above about 75% of its initial activity for periods of 5 months and longer. The use of polyoxyethylene derivative concentrations greater than about 5% results in chloramphenicol solutions which can be stored for many months and still substantially meet government standards requiring that the activity of the chloramphenicol at the time of use by the ultimate consumer, be at least 85% of its label concentration.

Most preferably, the concentration of the polyoxyethylene derivative is about 10%. While additional amounts of polyoxyethylene derivative could be added, little further advantage appears to be provided by polyoxyethylene derivative concentrations greater than about 10%. For example, the concentrations of polyoxyl stearate in a chloramphenicol-polyoxyl stearate solution required to provide zero degradation of the chloramphenicol after 150 days and after 280 days was 10% and 11%, respectively.

When used in combination with a long-chain polyol, the polyoxyethylene derivative concentration should be above about 1% and preferably above about 4% to substantially meet government regulations for extended periods of time. Most preferably, the polyoxyethylene derivative concentration is about 9% to provide chloramphenicol solutions having excellent stability. Amounts of polyoxyethylene derivative in excess of 9% may be used in combination with a long-chain polyol without producing any harmful effects.

The long-chain polyols usable in the modified chloramphenicol compositions include polyethylene glycol and polymerized mono-alcohols such as polyvinylalcohol. Preferably, the molecular weight of the polyethylene glycols varies between about 200 and about 6000 and the weight of the polyvinyl alcohols varies from about 10,000 to about 250,000. In a preferred embodiment, the long-chain polyol is polyethylene glycol having a molecular weight of about 300 and available under the trade designation polyethylene glycol E-300.

The concentration of the long-chain polyol varies from about 2.5% to about 50%. Preferably, the long-chain polyol concentration is about 15%.

The above-described polyoxyethylene and long-chain polyol components of the chloramphenicol solutions of this invention are of pharmaceutical grade, non-toxic, inert and capable of being sterilized without change in composition. Additionally, these components are safe for ophthalmic use as well as other well-known medical uses.

The amount of the chloramphenicol used herein will vary depending upon the particular application for which the chloramphenicol composition is to be used. However, the concentration of the chloramphenicol in the final product will be generally substantially less than the concentrations of the long-chain polyol and of the polyoxyethylene derivative. In general, the concentration of chloramphenicol will be less than about 1% by weight of the final product.

Other components may be included in the chloramphenicol final product provided they do not adversely affect the stability of the herein-described composition. For example, a germicide such as chlorobutanol may be included in the chloramphenicol compositions of this invention. The concentration of such other components will usually be less than about 1% by weight.

The balance of the chloramphenicol product is a solvent such as pure water. Other solvents such as propylene glycol and liquid petrolatum may be used where such solvents do not deleteriously affect humans in the particular application for which they are intended to be used.

The chloramphenicol solutions of this invention can be made up in a number of ways. A typical procedure employing polyoxyl stearate as the polyoxyethylene derivative, polyethylene glycol as the long-chain polyol and chlorobutanol as a germicide is as follows. The polyoxyl stearate and the polyethylene glycol are heated together until a homogeneous solution results. The clear solution is then cooled and the chloramphenicol is introduced into the solution and stirred until the solid has dissolved. The chlorobutanol is then added and stirred until dissolved. After cooling to room temperature, the appropriate amount of water is added and the solution stirred until homogeneous.

From the foregoing description, it will be apparent that the chloramphenicol compositions of this invention are solutions comprising chloramphenicol, a polyoxyethylene derivative of a fatty acid as described and a solvent, or the combination of these constituents including, in addition, a long-chain polyol. Because the chloramphenicol compositions of this invention are solutions (as compared with prior art suspensions) such problems as crystal growth and phase separation are virtually eliminated. For example, a chloramphenicol solution containing 0.55% chloramphenicol, 0.5% anhydrous chlorobutanol, 7.0% polyoxyl 40 stearate, 15% polyethylene glycol and sufficient distilled water to make 100%, was followed for two years at room temperature. After 1 year, no precipitate had formed. A light precipitate formed after 2 years.

The particular combination of components in the chloramphenicol products of this invention also greatly improves the chemical stability of chloramphenicol compositions. Chloramphenicol compositions containing only a polyoxyethylene derivative exhibit substantially improved chemical stability, that is, the activity of the chloramphenicol remains at a high level due to lack of degradation to other components for a materially longer time than prior art chloramphenicol compositions.

The improved chemical stability of chloramphenicol solutions including a polyoxyethylene derivative is shown by tests performed as follows. Polyoxyl 40 stearate was heated until it melted. Some pure water was added to the melted stearate and the chloramphenicol was then added with stirring. The balance of the pure water to make 100% was then added to provide the desired chloramphenicol solution. Several solutions were made up in this way with varying concentrations of stearate and chloramphenicol as shown in Table I.

TABLE I

| Initial percent chloramphenicol (by massay) | Polyoxyethylene derivative | Percent degradation after— | |
|---|---|---|---|
| | | 150 days | 280 days |
| 0.510 | 10% polyoxyl 40 stearate | 0.0 | 3.0 |
| 0.548 | 7% polyoxyl 40 stearate | 16.0 | 18.0 |
| | None | About 98% [1] | |

[1] Obtained from extrapolation of data in XL J. Am. Pharm. Ass'n., Scientific Ed., No. 9, p. 111 (September 1954).

The solutions were allowed to stand at room temperature (25° C.) for 280 days. After 150 days and at the end of this period, the solutions were assayed to determine the chloramphenicol activity. The results are tabulated in Table I.

The percent degradation of chloramphenicol decreases as the concentration of polyoxyl 40 stearate increases. Below a stearate concentration of about 1%, the degradation of chloramphenicol is too high, that is, above about 60%, to be of much utility. Above about 1% the utility of the chloramphenicol solutions increases to a point, about 7.5%, above which these solutions meet the afore-described government regulations for periods of at least 9 months. It will be understood that for periods of shorter duration than about 9 months, less stearate (polyoxyethylene derivatives) need be used to meet government specifications. For example, stearate concentrations above about 4% would satisfy these specifications for periods of about 3 months. Above about 11% stearate no measurable chloramphenicol degradation occurs within the limits of precision of the analytical methods used.

Addition of a long-chain polyol, to a solution containing chloramphenicol and a polyoxyethylene derivative provides some increased chemical stability as compared to a chloramphenicol-polyoxyethylene derivative solution. This is illustrated by the following tests. First, tests were conducted to determine the effect of a long-chain polyol alone on the chemical stability of chloramphenicol. Several solutions were made by first dissolving approximately the same amount of chloramphenicol in varying amounts of polyethylene glycol as shown in Table II. Pure water was added to each mixture to provide solutions of desired strength. The resulting solutions were allowed to stand for 280 days at room temperature. The remaining chloramphenicol activity was determined at 150 days and at 280 days. The data from these tests is tablulated in Table II.

TABLE II

| Initial percent chloramphenicol (by assay) | Long-chain polyol | Percent degradation after— | |
|---|---|---|---|
| | | 150 days | 280 days |
| 0.549 | 15% polyethylene glycol | 18.2 | 32.0 |
| 0.551 | 10% polyethylene glycol | 27.0 | 47.0 |
| 0.547 | 5% polyethylene glycol | 27.6 | 47.0 |
| 0.557 | 2.5% polyethylene glycol | | 47.0 |

The addition of polyethylene glycol to an aqueous solution containing chloramphenicol has only a small effect on the chemical stability of chloramphenicol. Additionally, comparison of Table 1 and Table 2 shows that polyethylene glycol has a relatively small effect on the chemical stability of chloramphenicol as compared with the use of a polyoxyethylene derivative alone.

Secondly, tests were conducted to illustrate the effect of the addition of polyethylene glycol to aqueous solutions containing both chloramphenicol and a polyoxyethylene derivate (polyoxyl stearate). A number of solutions were made up as follows: polyoxyl 40 stearate and polyethylene glycol (molecular weight 300) were heated together until a homogeneous solution resulted. The resulting clear solution was cooled and chloramphenicol was introduced into this solution and stirred until the solid dissolved. After cooling to room temperature, pure water was added. In each case, the resulting concentration of polyethylene glycol was 15% by weight and the concentration of stearate varied from 1% to 7%.

When the chloramphenicol solutions of this invention contain both a long-chain polyol and a polyoxyethylene derivative, degradation of the chloramphenicol is less than when only either a long-chain polyol or only a polyoxyethylene derivative is present with the chloramphenicol. For example, the use of a 15% polyethylene glycol-7% polyoxyl stearate solution results in about a 12% degradation whereas the use of 7% polyoxyl stearate alone and the use of 15% polyethylene glycol alone result in chloramphenicol degradations of about 18% and about 32%, respectively. Thus, it is evident that some improvement in the rate of degradation of chloramphenicol is produced by the addition of polyethylene glycol to a polyoxyl stearate-chloramphenicol aqueous solution.

As previously mentioned, chemical stability is measured not only by the lack of degradation of chloramphenicol which reduces chloramphenicol activity, but it also is measured by the lack of degradation of chloramphenicol to components harmful to humans. As further previously noted, it is believed that some present chloramphenicol compositions degrade to produce eye irritants in as short a time as 10 days. Thus, the use of such compositions for ophthalmic purposes is severely limited. It has now been discovered that the heretofore-described chloramphenicol solutions containing both a long-chain polyol and a polyoxyethylene derivative in the concentration ranges aforedescribed, will not degrade to form eye irritants. Chloramphenicol solutions containing a long-chain glycol and/or a polyoxyethylene derivative appear to be utilizable over long periods of time, i.e., substantially longer than 10 days without degradation of the solutions to form eye irritants.

The present invention has been described thus far in relation to a temperature of about 25° C. As is well known, the rate of degradation of chloramphenicol is increased by an increase in temperature and decreased by a decrease in temperature. Therefore, temperature variations from about 25° C. will require slightly more or slightly less long-chain polyol and/or polyoxyethylene derivative than the concentrations previously set forth to provide a particular chloramphenicol percent degradation. Additionally, it has been found that elevated temperatures, e.g., 70° C., tend to produce a precipitate in the herein-described chloramphenicol solutions whereas low temperatures, e.g., 4° C., tend to prevent the formation of precipitates for periods in excess of two years. However, because degradation of chloramphenicol in the solutions of this invention is apparently by a reaction mechanism which produces no eye irritants, variations in temperature apparently do not have any effect on the use of the herein-described chloramphenicol solutions for ophthalmic purposes.

The following example further describes the chloramphenicol solutions of this invention.

EXAMPLE

This example illustrates the excellent stability of the herein-described aqueous chloramphenicol solutions containing a polyoxyethylene derivative and a long-chain polyol.

A chloramphenicol solution was formulated as described heretofore comprising:

| | Percent |
|---|---|
| Chloramphenicol | 0.55 |
| Polyoxyl 40 stearate U.S.P. | 7.0 |
| Polyethylene glycol E-300 | 15.0 |
| Chlorobutanol anhydrous U.S.P. | 0.5 |
| Distilled water to make | 100.0 |

A batch of this formulation was prepared and samples from this batch were placed in stability testing at 4° C., 25° C. and 32° C. The chloramphenicol concentration of each sample was followed by the accepted turbidometric method (Code of Federal Regulations, Title 21, 141d.301).

The testing was continued for approximately 2 years. At the end of this time, a slight precipitation was noted in the sample at 25° C. but no precipitate was present in the sample at 4° C. Furthermore, no eye irritants were found in any of the chloramphenicol solutions at the end of 2 years.

The chloramphenicol maintains an activity of 85% of its initial value or greater at 25° C. for about 500 days.

From the foregoing, it will be appreciated that this chloramphenicol formulation exhibits excellent chemical and physical stability for up to 2 years.

From the foregoing, it will be understood that a unique chloramphenicol composition has been described which greatly expands the usefulness of chloramphenicol. The herein-described chloramphenicol compositions are solutions comprising, in addition to relatively small amounts of chloramphenicol and a solvent, at least about 1% by weight of a polyoxyethylene derivative and up to about 50% by weight of a long-chain polyol. Preferably, the solvent is sterile water. As constituted, the chloramphenicol solutions exhibit superior physical and chemical stability. Additionally, degradation of the chloramphenicol is apparently by a path which does not result in degradation products detrimental to humans. Thus, these chloramphenicol solutions exhibit both a slow rate of degradation of chloramphenicol and degradation of chloramphenicol to products which are safe for human use thereby providing chloramphenicol solutions which can be safely used many months after preparation.

While certain embodiments are disclosed herein, modifications which lie within the scope of this invention will occur to those skilled in the art. We intend to be bound only by the scope of the claims which follow.

What is claimed is:
1. A physically and chemically stable chloramphenicol solution consisting essentially of about 0.55 weight percent of chloramphenicol, about 7.0 weight percent of polyoxyethylene 40 stearate, about 15.0 weight percent of polyethylene glycol having a molecular weight of about 300 and distilled water to make 100 percent by weight.
2. A composition in accordance with claim 1 including about 0.5 weight percent of chlorobutanol.

References Cited

FOREIGN PATENTS 784,659  10/1957  Great Britain _____ 424—324

OTHER REFERENCES

Extra Pharmacopies, 25th ed., Martindale, London Pharmaceutical Press, p. 946, 1967.

Remingtons Practice of Pharmacy, 1956 ed., p. 615, Mack Publishing Company.

Remingtons Practice of Pharmacy, 1961, ed., pp. 223–4, Tack Publishing Company.

ALBERT T. MEYERS, Primary Examiner

D. M. STEPHENS, Assistant Examiner